Patented Mar. 26, 1940

2,194,724

UNITED STATES PATENT OFFICE 2,194,724

GUAIACOL COMPOUND AND THE PRODUCTION THEREOF

Salo Rosenzweig, Vienna, Austria, assignor to Interpublic A.-G., Zurich, Switzerland, a Swiss corporation No Drawing. Application December 24, 1937, Serial No. 181,722. In Austria December 31, 1936

7 Claims. (Cl. 260—461)

This invention relates to new salts of phosphoric acid mono- or bis-(2-methoxyphenyl) ester and ammonia, and to the production thereof. For the purpose of producing these salts the esters named are converted either with free ammonia or with ammonium compounds such as ammonium salts, e. g. salts of volatile and/or weak acids (such as ammonium carbonate for instance). The new ammonium salts may also be produced by the conversion of adequately soluble other salts of the esters with ammonia or ammonium salts. As ester salts there may be employed for example salts which are readily soluble in aqueous solvents, such as alkali and alkaline earth salts of copper, as also salts with organic bases as starting material. In place of the said esters or their salts there may also be employed other derivatives of the esters, e. g. triesters, acid halides, such as for example phosphoric acid-(2-methoxyphenyl)-ester-dichloride or phosphoric acid-bis-(2-methoxyphenyl)-esterchloride. When the tri-ester is used the salt may be formed for example by partial saponification with ammonia. The conversion reaction with the derivatives named by way of example may also be caused to proceed in such a manner that first of all the corresponding acid amide is formed, which is then converted into the ammonium salt by hydrolysis with water or aqueous media.

It is known that on partial or complete neutralization the acid guaiacol phosphoric acid esters yield acid or neutral alkali or alkaline earth salts. The salts of the said esters with organic bases are also known. These compounds have valuable properties, such as favorable resorptivity, and new physiological effects in addition to the physiologically valuable properties of the basic constituents.

As compared with the known saline guaiacol compounds, the new ammonium salts have the following advantages. They likewise have the advantageous property of allowing the guaiacol component to become readily split off in the organism, while at the same time they have the effect of promoting expectoration. Further and very considerable advantages are attributable to these new salts from a technical and economic point of view. It has been found surprisingly to be the case that the ammonium salts according to the invention have a very favorable and pronounced crystallizing power and solubility in water, alcohols, and other liquids, so that the production of these salts in the pure state is very simple and inexpensive as compared with that of the above-mentioned other salts of the same ester acids. Owing to these advantageous properties, the new ammonium salts according to the invention are also suitable for use as starting material in the production of other salts of the ester acids. For example, salts of the ester acids with organic bases may be produced very easily and in a pure state by causing the requisite amount of the organic base to react with a calculated quantity of ammonium salt in the presence of a reaction medium such as water, alcohol, aqueous liquid, moisture, and the like. The new salt is then formed with the liberation of ammonia which is easily removed.

The practising of the invention will now be illustrated by some quantitative examples, but it is to be understood that the invention is by no means limited to these examples.

Examples (1) A solution of 20 grams of phosphoric acid bis-(2-methoxyphenyl)-ester in as small a quantity as possible of aqueous alcohol is neutralized with ammonia until it gives an accurately neutral reaction when tested with litmus. The resulting crystalline mass is separated from the mother liquor and recrystallized from water.

(2) The solution of 35 grams ($\frac{1}{10}$ mol) of sodium salt of phosphoric acid bis-(2-methoxyphenyl)-ester, containing water of crystallization, in as small a quantity of hot water as possible, is admixed with a hot solution of 5.4 grams ($\frac{1}{10}$ mol + a small excess) of ammonium chloride in about 15 grams of water. On cooling, the reaction mixture sets to a crystalline mass; the salt is obtained in a perfectly pure state by re-crystallization from water.

(3) 20 grams of phosphoric acid bis-(2-methoxyphenyl)-ester-chloride is slowly converted with ammonia in the presence of water, ammonia being added until the reaction mixture is neutral to litmus. The crude product is re-crystallized in water.

The ammonium salt of the phosphoric acid bis-(2-methoxyphenyl)-ester obtained in accordance with Examples 1–3 crystallized in long fine needles, is odorless, and dissolves in approximately 12 parts of water at 18° C. In alcohol the compound is more difficultly soluble. $F=234$–$235°$. $NH_4$ content for $C_{14}H_{18}O_6$ NP calculated 5.51%, ascertained by analysis 5.54%.

(4) A solution of 10.2 grams ($\frac{1}{20}$ mol) of phosphoric acid mono-(2-methoxyphenyl)-ester in approximately 50 ccs. of 90% alcohol (by vol.) is admixed with 3.4 grams ($\frac{1}{20}$ mol) of 25% ammonia. A crystalline precipitate immediately forms, which can be recrystallized in aqueous alcohol.

(5) 120 grams of phosphoric acid (2-methoxyphenyl)-ester dichloride is saponified with 120 grams of water. Conc. ammonia is then added slowly until the neutral condition is reached as indicated by Congo (approximately 108 grams). At the same time there is precipitated out almost quantitatively the simultaneously evolved acid ammonium salt of the phosphoric acid mono-(2-methoxyphenyl)-ester, which is difficultly soluble in the ammonium chloride solution simultaneously formed. After cooling, the crystals are filtered off on a suction filter with powerful suction action, washed with a small quantity of water, and recrystallized in alcohol 70% strong by volume.

The primary ammonium salt obtained in accordance with Examples 4 and 5 crystallizes in colorless needles; it is odorless and dissolves in approximately 4 parts of water at 18° C., but only very difficultly in alcohol. $F=192$ to 195 (with decomposition). $NH_4$ content for $C_7H_{12}O_5NP$ calculated 8.16%, ascertained 8.24; 8.22%.

(6) 10.2 grams ($\frac{1}{20}$ mol) of phosphoric acid mono-(2-methoxyphenyl)-ester is dissolved in 50 ccs. of alcohol (90% strong by volume) and admixed with 6.8 grams ($\frac{1}{10}$ mol) of 25% aqueous ammonia. The resulting precipitate, which is formed in abundance, may be recrystallized in aqueous alcohol for purposes of purification.

(7) 22.1 grams of primary ammonium salt of phosphoric acid mono-(2-methoxyphenyl)-ester is dissolved in approximately 100 ccs. of water; the resulting solution is neutralized with conc. ammonia, using litmus as indicator. Alcohol is then added in such quantity that the solution contains 70% thereof. The reaction mixture is then heated on a reflux condenser until the precipitate first formed is dissolved. On cooling, perfectly pure diammonium salt of phosphoric acid mono-(2-methoxyphenyl)-ester separates out in abundance.

The secondary ammonium salt obtained in accordance with Examples 6 and 7 crystallizes in colorless, needle-shaped prisms, is odorless, dissolved in about 2 parts of water at 18° C., and is almost insoluble in alcohol. $F=188$ to 189° (with decomposition). $NH_4$ content for $$C_7H_{15}O_5N_2P$$

calculated 15.15%, ascertained 15.21%.

I claim:

1. A salt consisting of a polybasic phosphoric acid partly esterified with guaiacol and ammonia as the basic constituent.

2. A salt consisting of phosphoric acid-bis-(2-methoxyphenyl)-ester and ammonia as the basic constituent.

3. A salt consisting of one mol of phosphoric acid-mono-(2-methoxyphenyl)-ester and two mols of ammonia as the basic constituent.

4. A salt consisting of one mol of phosphoric acid mono-(2-methoxyphenyl)-ester, and one mol of ammonia as the basic constituent.

5. The process of preparing salts of guaiacol phosphoric acid esters comprising neutralizing an aqueous alcoholic solution of phosphoric acid-bis-(2-methoxyphenyl)-ester with ammonia, separating the resulting crystalline ammonium from the mother liquor and recrystallizing the same from its aqueous solution.

6. The process of preparing salts of guaiacol-phosphoric acid esters comprising neutralizing a saponified solution of phosphoric acid-(2-methoxyphenyl)-ester dichloride with conc. ammonia.

7. The process of preparing salts of guaiacol phosphoric acid esters the step of causing to react at least one substance selected from the group consisting of ammonia and ammonium salts as basic component upon at least one substance selected from the group consisting of guaiacolphosphoric acid esters, acid halogen compounds of guaiacolphosphoric acid esters, inorganic salts of guaiacol phosphoric acid esters except ammonium salts and organic salts of guaiacol phosphoric acid esters

SALO ROSENZWEIG.